United States Patent [19]

Stefanik et al.

[11] 4,083,470
[45] Apr. 11, 1978

[54] GRAIN BOX COVER

[76] Inventors: Paul Stefanik, R.R. #2, Petrolia, Ontario; John Voytko, Leonard Crescent, Forest, Ontario, both of Canada

[21] Appl. No.: 782,739

[22] Filed: Mar. 30, 1977

[30] Foreign Application Priority Data

Apr. 2, 1976   Canada .................................. 249428

[51] Int. Cl.² ........................................... B65D 43/16
[52] U.S. Cl. .................................... 220/254; 220/334
[58] Field of Search ............... 220/1 T, 17, 254, 63 R, 220/65, 334; 232/43.1

[56] References Cited

U.S. PATENT DOCUMENTS

| | | | |
|---|---|---|---|
| 1,424,520 | 8/1922 | Richardson et al. ................. | 220/254 |
| 1,552,027 | 9/1925 | Baxter ................................... | 220/254 |
| 1,691,160 | 11/1928 | Meuttman ............................ | 220/254 |
| 1,964,513 | 6/1934 | Hammer ............................... | 220/254 |
| 3,235,119 | 2/1966 | Smith .................................. | 220/1 T X |

Primary Examiner—Stephen Marcus
Attorney, Agent, or Firm—Wigman & Cohen

[57] ABSTRACT

A cover for rectangularily shaped grain boxes includes an essentially vertical extending circumscribing wall which mates with the walls of the grain box to thereby extend the volume and the depth of the grain box, an inclined roof surmounting the extending and circumscribing wall, and two hingeable lids attached to the roof which, in their closed position form a part of the roof, shielding the contents of the grain box from direct exposure to the elements, and while in the open position exposing the interior of the box.

4 Claims, 4 Drawing Figures

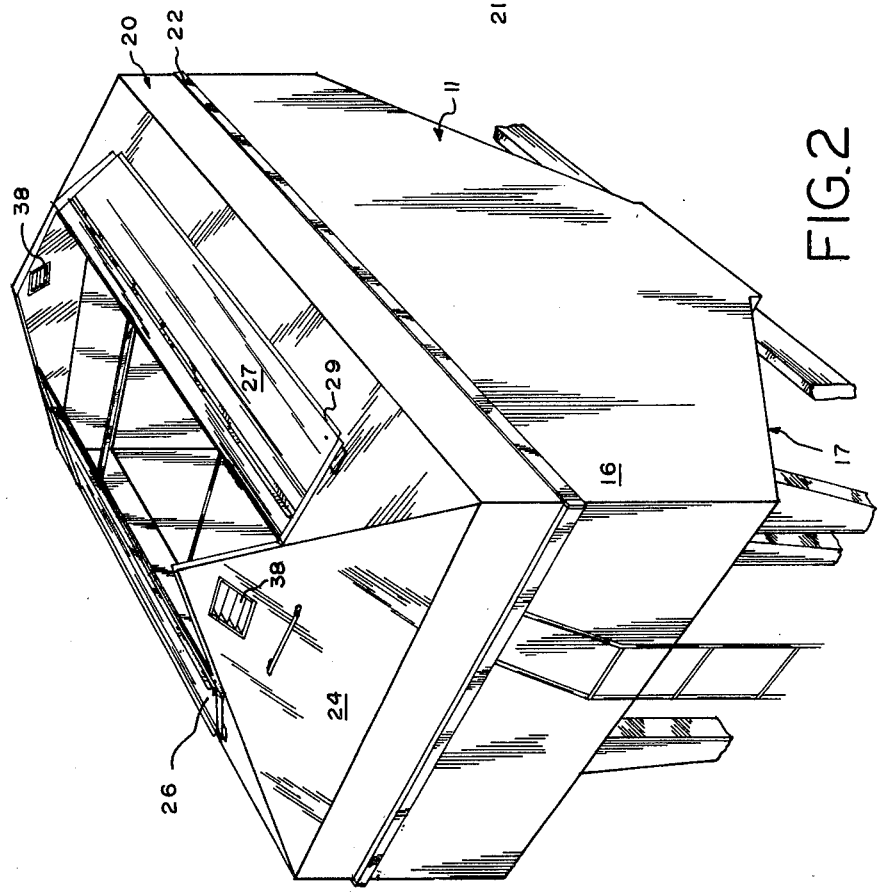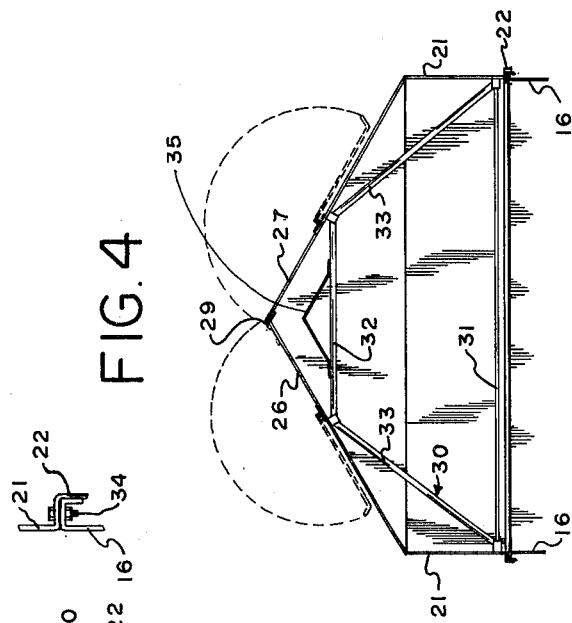

GRAIN BOX COVER

This invention relates to a grain box cover.

More particularly the invention relates to a rigid openable-closeable cover to be affixed to mobile or vehicular grain boxes and the like.

This invention contemplates a cover for a grain box or grain tank of the conventional mobile or vehicular grain boxes which are used as temporary storages for the transport of grain from the field, after thrashing, to the grain elevator.

It is relatively common place, in North America, for farmers, during thrashing of grain, to relieve the grain from the combine into an open wagon for subsequent transport from the field to either an interim storage on or off the farm, or to the grain elevator.

More recently, it has become popular to use mobile or vehicular grain boxes for this purpose. Such mobile grain boxes include essentially a rectangular storage box exposed at the top to the elements, while its bottom is shaped generally into a trough or chute incorporating a sliding door, or the like, by which a portion of the bottom may be opened. The grain in the box slides out, when the door is open, by gravity and the grain box emptied. These grain boxes are mounted on a frame with four wheels and have a hitch post whereby the box may be pulled by a tractor or the like from place to place; hence mobile. They also may be self propelled.

Since such mobile grain boxes have generally an open top, exposing the contents thereof to the elements, in inclement weather, moisture collects on the grain in the box; grain quality is reduced. In acute circumstances mould may set in or the grain may otherwise severally deteriorate.

The invention therefore achieves a removal grain box cover with an openable and closeable lid. The cover also increases the volumetric storage capacity of the grain box. When the lids are closed, the box and its contents are shielded from direct exposure to the elements and moisture. Preferably, the roof profile of the cover is at an angle close to the angle of repose for most grain; that is, at about 35° from the horizontal.

The invention therefore contemplates the grain box cover for mounting over the rectangular shaped grain box, the cover comprising:
 (a) an essentially vertical extending circumscribing wall mating with the grain box to thereby extend the depth and hence the volume of the grain box;
 (b) an inclined roof surmounting the extending circumscribing wall;
 (c) a hingeable lid attached to the roof, said lid in its closed position forming part of the roof and thereby shielding the contents of the grain box from direct exposure to the elements, and when open, exposing the interior of the grain box.

The invention will now be described by way of example and reference to the accompanying drawings in which:

FIG. 2 is a perspective view of the grain box of FIG. 1, lids of the cover open;

FIG. 3 is a section through the cover;

FIG. 4 is an exploded section of the mating detail between the box and cover.

Figure 1:
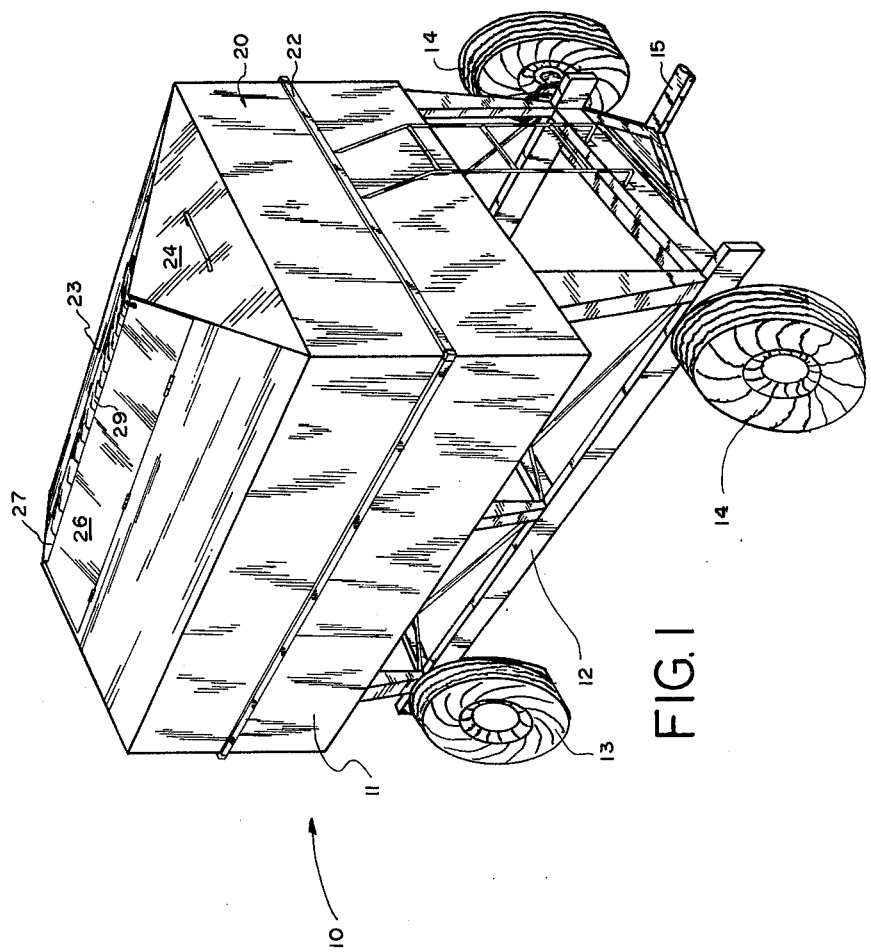
FIG. 1 is a perspective view of a grain box with cover showing the lids in their closed position.

Referring to FIG. 1 a mobile grain box 10 consists of a grain box 11 secured to a frame 12 which has wheels 13 and 14 mounted for rotation at each of the corners of the frame. The front wheels 14 are actually mounted on a bogie front axle so that a hitch bar 16 attached thereto forms a bogie steering system.

The grain box 11 is generally formed from sheet metal, into a generally rectilinearly shaped box with walls 16. The bottom of the box descends into a lateral trough or shute with a door, allowing for grain removal, mounted at the lower end of the chute. The door (not shown) is a sliding door generally coincident with one side of the box. This facilitates easy grain removal.

The lip of the walls 16 of the grain box 11 are usually flanged outwards, as clearly seen in FIG. 4, or may be formed into a rolled bead (not shown). The lip profile is used to advantage in securing a grain box cover 20 embodying the invention.

The grain box cover 20 has a circumscribing wall 21 with a lower protrusion 22 which mates over the lip of the grain box wall as seen in FIGS. 3 and 4. The wall 21 transforms into a hip roof 23 having inclined end segments 24. Two hinged lids 26 and 27 are mounted in the roof. Both lids are hinged below the rib of the roof and are essentially trapezoidal shaped. The ends of each lid rest on the roof end segments 24, when the lids are closed. One lid 27 is provided with a lateral flange 29 which overlays the other lid 26 when the lids are closed and forms the actual rib in the roof. This prevents moisture from entering between the lids.

The lids may also be provided with handles (not shown) by which the lids may be swung from their open to their closed position.

In order to impart stability to the cover, an internal frame system 30 includes upper and lower horizontal members and inclined side members. The ends upper horizontal member 32 meets with the inclined side members 33 at or near the region of the hinge for each lid. The incline side members 33, on the other hand, also meet, with the lower horizontal member 31 at or near that region where the wall 21 extends into the lip flange 22 which mate with the wall 16 of the grain box. In order to secure the cover 20 in place serially disposed bolts 34 extend through the lip and flange, and are held in place by appropriate nuts (see FIG. 4). A lifting hook 35 may be welded to the upper horizontal member 32 to provide means for lifting the cover and hence for placing or removing the cover off the box.

In order to ensure breathing of the grain when the grain box cover is closed, double reverse louvers 38 maybe mounted in the inclined end segments 24 as shown in FIG. 2.

The embodiments of the invention in which an exclusive property or privilege is claimed are defined as follows:

1. A grain box cover for mounting over a rectangularly shaped grain box, comprising;
 (a) an essentially vertical extending circumscribing wall mating with the grain box to thereby extend the depth and hence the volume of the grain box;
 (b) an inclined roof surmounting the extending circumscribing wall, the roof defining an apex along a substantial length thereof from which the roof inclines downward in at least two directions;
 (c) a hingeable lid, hinged at its proximate margin to said roof at a location downwardly from the apex thereof, said lid including a distal margin which extends along the roof apex when in closed position; and (d) hinge means attached to said proximate margin of said hingeable lid and to the roof, said hinge means being disposed below the apex of the roof, said lid, in its closed position, forms part of the roof as the distal margin extends to the apex of the roof to thereby shield the contents of the grain box from direct exposure to the elements, and while in its open position, said lid overlays a segment of the roof below the hinge means to expose the interior of the box.

2. The grain box according to claim 1 including a first and a second hingeable lid, hinge means for each of said lids pivotally connecting the respective hingeable lid to the roof, said first hingeable lid having its distal margin bent so that it overlays the distal margin of said second hingeable lid when the lids are closed, the bent margin of said first lid forming the apex of the roof and prevents moisture from entering the grain box.

3. The grain box as claimed in claim 2 wherein the distal margin of said second lid is also bent and underlays the distal margin of said first lid when the lids are closed.

4. The grain box according to claim 1 further including louvre means located in said inclined roof to ensure breathing of the grain when the lids are in closed position.

* * * * *